United States Patent
Parimi et al.

(10) Patent No.: US 8,211,375 B2
(45) Date of Patent: Jul. 3, 2012

(54) FLOW DISTRIBUTION DEVICE FOR DOWNFLOW CATALYTIC REACTORS

(75) Inventors: Krishniah Parimi, Alamo, CA (US);
Steven X. Song, Albany, CA (US);
Ralph E. Killen, San Francisco, CA (US); Ronald K. Meeker, Clayton, CA (US); Steven A. Souers, Ocean Springs, MS (US)

(73) Assignee: Chevron U.S.A. Inc., San Ramon, CA (US)

(*) Notice: Subject to any disclaimer, the term of this patent is extended or adjusted under 35 U.S.C. 154(b) by 344 days.

(21) Appl. No.: 12/575,334

(22) Filed: Oct. 7, 2009

(65) Prior Publication Data

US 2011/0081282 A1    Apr. 7, 2011

(51) Int. Cl.
*B01J 8/02* (2006.01)
*B01J 8/00* (2006.01)

(52) U.S. Cl. ........ 422/220; 422/606; 422/607; 422/224; 261/96; 261/98; 261/76; 261/109; 261/111

(58) Field of Classification Search .................. 422/606, 422/607, 648, 220, 224; 261/96, 98, 76, 261/109, 111
See application file for complete search history.

(56) References Cited

U.S. PATENT DOCUMENTS

| | | | |
|---|---|---|---|
| 4,836,989 A * | 6/1989 | Aly et al. | 422/605 |
| 4,933,047 A | 6/1990 | Bannon | |
| 6,093,373 A | 7/2000 | Darmancier | |
| 7,452,516 B2 | 11/2008 | Van Hasselt et al. | |
| 7,473,405 B2 | 1/2009 | Kemoun et al. | |
| 2001/0055548 A1 | 12/2001 | Harter et al. | |
| 2005/0062178 A1 | 3/2005 | Harter et al. | |
| 2005/0077635 A1 | 4/2005 | Van Hasselt et al. | |
| 2006/0078483 A1* | 4/2006 | Kemoun et al. | 422/188 |
| 2006/0257300 A1 | 11/2006 | Breivik et al. | |

FOREIGN PATENT DOCUMENTS

| | | |
|---|---|---|
| EP | 01721660 A1 | 11/2006 |
| WO | WO2005016508 A1 | 2/2005 |

OTHER PUBLICATIONS

PCT/US2010/051583, International Search Report, mailing date Jun. 10, 2011, pp. 1-8.

* cited by examiner

*Primary Examiner* — Walter D Griffin
*Assistant Examiner* — Lessanework Seifu
(74) *Attorney, Agent, or Firm* — Alan W. Klaassen

(57) ABSTRACT

The invention is a fluid distribution device for coupling with a fluid distribution conduit or chimney for improving the distribution of downwardly flowing poly-phase mixture including at least one gas phase and at least one liquid phase, above at least one catalyst bed of granular solid catalytic material. The fluid distribution device for receiving the liquid and gas phases has one or more openings in the top and/or upper portion of its height through which a gas phase can enter and has a gas conduit that opens to a mixing cavity within the device. The fluid distribution device further comprises one or more lateral openings for liquid ingress. The lateral opening or openings allow the liquid to enter a liquid conduit that opens to the internal mixing cavity. The mixing cavity allows intimate contact between the liquid and gas phases. Therefore the flow distribution device of the invention provides improved tolerance for tray out of levelness.

19 Claims, 2 Drawing Sheets

FLOW DISTRIBUTION DEVICE FOR DOWNFLOW CATALYTIC REACTORS

FIELD OF THE INVENTION

This invention relates to a fluid distribution device for downflow multi-bed catalytic reactors. Reactors of this type are employed in the chemical and petroleum refining industries for effecting various reactions such as catalytic dewaxing, hydrotreating, hydrofinishing and hydrocracking. The present fluid distribution device is particularly useful for effecting mixed-phase reactions between a liquid and a vapor. More particularly, the invention relates to a device for improving the distribution and mixing of gas and liquid egressing a distributor plate above the top of a succeeding catalyst bed. The distributor device is particularly suitable for catalytic reactors in which gas-liquid mixtures are passed through beds of solid catalyst particles, particularly for downflow catalytic reactors used for hydrotreating and hydrocracking in oil refining operations.

BACKGROUND

Many catalytic processes are carried out in reactors that contain a series of separate catalytic beds. Reactors used in the chemical, petroleum refining and other industries for passing liquids or mixed-phase liquid/vapor mixtures over packed beds of particular solids are employed for a variety of different processes. Typical of such processes in the petroleum refining industry are catalytic dewaxing, hydrotreating, hydrodesulfurisation, hydrofinishing and hydrocracking. In these processes a liquid phase is typically mixed with a gas or vapor phase and the mixture passed over a particulate catalyst maintained in a packed bed in a downflow reactor.

In downflow reactors, it is necessary that gas and liquid are properly mixed and uniformly distributed across the horizontal cross section of the reactor prior to entering the catalyst beds. Uniform distribution helps ensure efficient utilization of catalyst, reduced catalyst top layer attrition, improved yields, improved product quality, and increased run lengths. Generally, in a multi-bed downflow catalytic reactor, a plurality of catalyst beds is arranged within the reactor and a distributor system for the proper mixing of gas and liquids is arranged in the region between two subsequent catalyst beds. This region is normally provided with a gas injection line underneath a catalyst bed, whereby additional gas is injected to compensate for the gas already consumed in the previous catalyst bed. The injected gas can also act as a quench gas. Generally, the injected gas is hydrogen or comprises hydrogen. The liquid falling downward from the above-lying catalyst bed is allowed to accumulate on a collector tray. The quench gas and liquid then pass into a mixing chamber where a swirling movement of the liquid is provided. This enables good mixing of the liquid and thereby even temperature conditions of the liquid. Gas-liquid mixing also takes place inside the mixing chamber. The fluid from the mixing chamber falls downward onto a deflector or impingement plate, whereby the flow is redirected onto a first distributor tray having a large number of downflow openings for the passage of liquid. For cross-sectional liquid flow distribution, the downflow openings can comprise one or more conduits, or chimneys. The chimney is a cylindrical structure with an open top and one or more openings in the upper portion of its height through which a gas phase can enter. The gas phase travels downward through the length of the chimney cylinder. The lower portion of the chimney can have one or more lateral openings for liquid flow through which a liquid phase can enter the cylindrical structure of the chimney and contact the gas phase. As liquids accumulate on the distributor tray, they rise to a level that covers the lateral opening or openings in the chimney so that the passage of gas is precluded and so that the liquid can enter through the lateral opening or openings into the cylindrical structure. Gases and liquids egress via an opening in the bottom of the chimney, through the distributor tray, and onto an underlying catalyst bed. Only limited mixing between the two phases happens in the cylindrical structure because of the low turbulence around liquid streams.

A good flow distribution device should meet the following four basic requirements: provide even distribution of feed to a catalyst bed over a range of gas and liquid rates; be tolerant to certain out-of-levelness of the distribution tray; provide good gas-liquid mixing and heat exchange, and require minimum catalyst bed height to fully wet the underlying catalyst bed. Because the driving force for liquid flow into the chimney is the static liquid height on the tray, standard chimneys can be deficient in meeting these criteria due to poor tolerance for deviations from levelness of the distributor tray. They also suffer from suboptimal spray discharge of fluids onto the underlying catalyst bed.

One of the key considerations in flow distributor design is the discharge pattern of liquid and gas from the device. A standard chimney distributor provides only some point contacts of liquid with the catalyst bed. As a result, it takes certain bed height to adequately wet the catalyst surface and for the desired catalytic reactions to occur. A more uniform and consistent spray pattern and more uniform catalyst wetting in a short length of catalyst bed are desired. It is an object of this invention to achieve an even distribution of fluid over the top of the catalyst bed as a sustained spray. It is another object of the invention to improve the tolerance for flow distributor design for distributor tray out of levelness.

SUMMARY OF THE INVENTION

In order to maximize the performance of multi-bed catalytic reactors, chimneys that allow good mixing of gas and liquids and evenly distribute the gas/liquid mixture to an underlying catalyst bed are important. In an embodiment, the invention provides for a flow distribution device for distributing a poly-phase fluid to a granular solid, comprising at least one gas conduit for introducing a gas phase into a mixing cavity having a radial diameter which is greater than a radial diameter of the gas conduit, the gas conduit extending from a gas inlet opening through a lower gas conduit opening into the mixing cavity, the gas conduit opening being positioned no lower than the lower extent of a liquid conduit that is provided for introducing a liquid phase into the mixing cavity; and a poly-phase nozzle for accelerating and dispersing the liquid and gas phases passing out of the flow distribution device, the nozzle having an nozzle inlet that is fixidly coupled to and co-axially aligned with the mixing cavity.

In another embodiment, the invention provides for a distributor tray having at least one chimney for distributing a downwardly flowing poly-phase mixture including at least one gas phase and at least one liquid phase, above at least one catalyst bed of granular solid catalytic material, the chimney including one flow distribution device that has been retrofit into the chimney, the flow distribution device comprising at least one gas conduit for introducing a gas phase into a mixing cavity having a radial diameter which is greater than a radial diameter of the gas conduit, the gas conduit extending from a gas inlet opening through a lower gas conduit opening into the mixing cavity, the gas conduit opening being positioned no lower than the lower extent of a liquid that is provided for introducing a liquid phase into the mixing cavity; and a polyphase nozzle for accelerating and dispersing the liquid and gas phases passing out of the flow distribution device, the nozzle having an nozzle inlet that is fixidly coupled to and co-axially aligned with the mixing cavity.

DETAILED DESCRIPTION OF THE INVENTION

Figure 1:
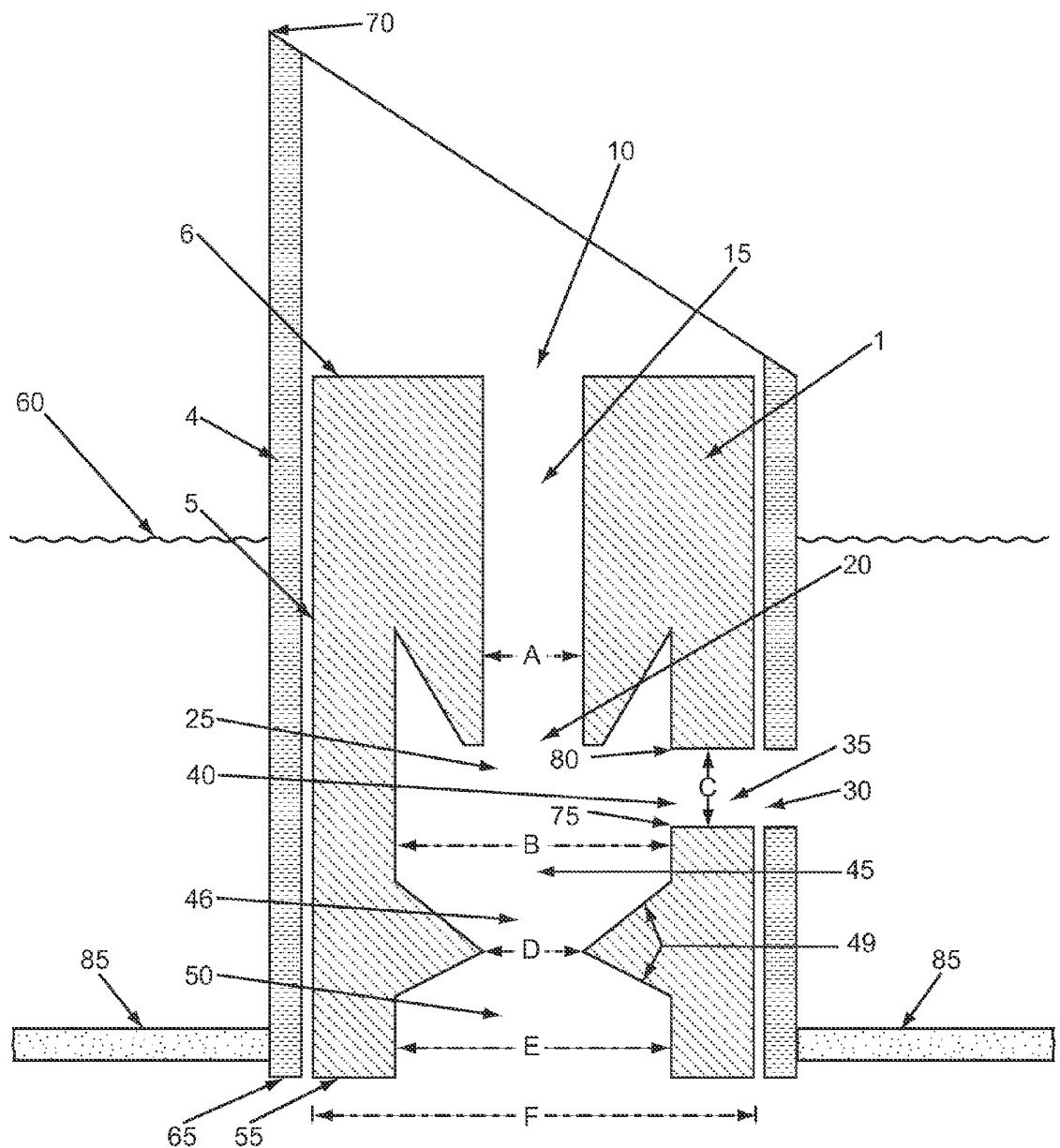
FIG. 1 is a schematic, cut-away side view of an embodiment of the flow distribution device of the invention.

The invention in one embodiment is a fluid distribution device for distributing a downwardly flowing poly-phase mixture including at least one gas phase and at least one liquid phase, above at least one catalyst bed of granular solid catalytic material. The fluid distribution device for receiving the liquid and gas phases has one or more openings in the top and/or upper portion of its height through which a gas phase can enter and has a gas conduit that opens to a mixing cavity within the device. The fluid distribution device further comprises one or more lateral openings for liquid ingress. The lateral opening or openings allow the liquid to enter a liquid conduit that opens to the internal mixing cavity. The mixing cavity allows intimate contact between the liquid and gas phases. The gas inlet tube is narrower than the mixing cavity, causing a venturi type effect, and creating a lower pressure in the interior of the fluid distribution device. The pressure differential helps "pull" the liquid phase through the liquid conduit to the mixing cavity. Thus, rather than static liquid height on the tray, liquid flow rate through the lateral openings is at least in part determined by the venturi effect of the relatively narrow gas conduit. Therefore the flow distribution device of the invention allows greater tolerance for tray out of levelness than chimneys of the prior art. The fluid (mixed gas and liquid phases) exits the fluid distribution device via a tapered and beveled venturi outlet as a wider spray pattern. The pressure drop across the fluid distribution device is minimized for energy saving and to reduce attrition on top bed layer.

The fluid distribution device of the invention can be used in downflow catalytic reactors. In the downflow catalytic reactor the flow distribution device of the invention allows gas phase and liquid phase mixing and distributes the fluids as a well dispersed spray onto, for example, an underlying catalyst bed. As used herein, gas, liquid, and combinations thereof are referred to as "fluid" or "fluids".

The flow distribution device of the invention can be inserted into a preexisting chimney in a distribution tray assembly. In such a retrofit application the flow distribution device that can be inserted into a pre-existing chimney would thus be referred to as a chimney insert. In a new reactor design the flow distribution device can be installed directly in the distribution tray in place of a chimney. Generally, the fluid distribution device of the invention can range in size from about 1 inch in diameter to about 4 inches in diameter, although smaller or larger diameters are possible depending on the application. In some such embodiments, the fluid distribution device of the invention can range in size from about 1.5 inch in diameter to about 3 inches in diameter The number of fluid distribution devices of the invention for use in a downflow catalytic reactor can vary and is selected according to the desired flow rates and other conditions desired in the downflow catalytic reactor. The selection process for the number of fluid distribution devices of the invention is similar to the conventional selection process for determining the number of standard chimneys in a downflow catalytic reactor.

Figure 2:
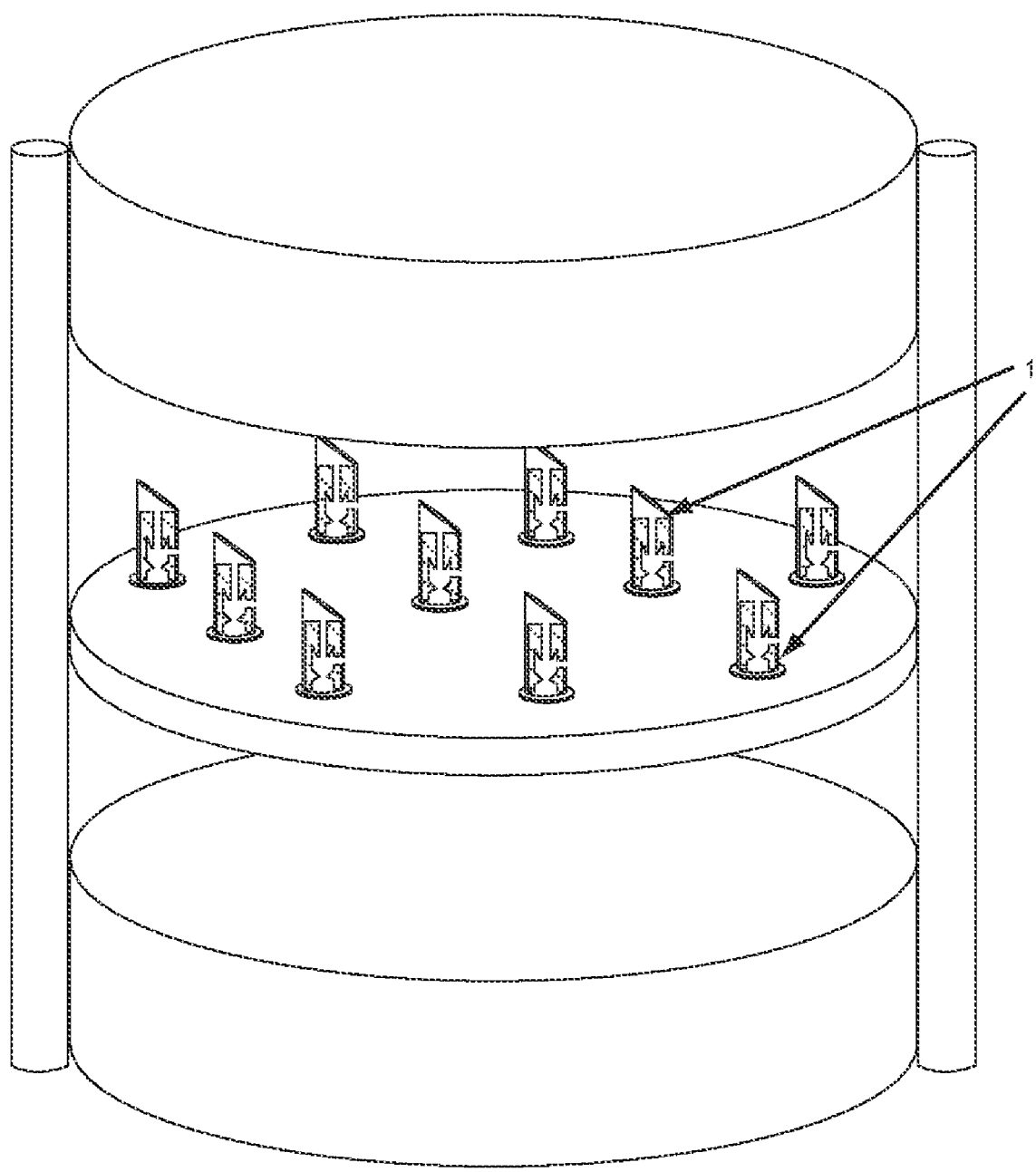
FIG. 2 is a simplified schematic, perspective, side cut-away view of the flow distribution device of the invention in the context of a reactor vessel.

In embodiments, the flow distribution device may be employed in a retrofit application. A pre-existing chimney can be used and the flow distribution device inserted into the existing chimney. For example, FIG. 1 shows how the flow distribution device 1 can be employed as an insert in which the diameter of the device is such that it will insert into a pre-existing chimney in distributor tray 85, forming an essentially fluid tight seal with the chimney wall 4. FIG. 2 further illustrates a distribution of chimneys, including the flow distribution device 1, on a distributor tray. In embodiments, the fluid distribution device extends upwardly from the bottom of the chimney 65 to a height that is greater than 50% or greater than 75% of the distance between the bottom of the chimney 65 and the top of the chimney 70. The invention can be scaled so as to insert into a variety of differently sized pre-existing chimneys for retrofit application. Scaling can be accomplished by measuring the interior diameter of the pre-existing chimney and scaling the outer diameter of the flow distribution device of the invention to be smaller than the interior diameter of the pre-existing chimney. In embodiments, the diameter of the outer diameter of the device will range from about 1.5 inches to about 3 inches, although smaller or larger diameters are not excluded and depend on the application. In another embodiment, the invention can be employed as a standalone fluid distribution device.

In both retrofit and non-retrofit embodiments, the outer wall 5 forms a cylindrical structure. A top capping portion 6 caps the cylindrical structure formed by the outer wall 5, and is in fluid tight connection with the cylindrical outer wall. The top capping portion 6 comprises at least one gas inlet opening 10. In embodiments, the gas inlet opening ranges in diameter from about 0.1 inches to about 1.0 inches, although smaller or larger diameters are not excluded and depend on the application. In some such embodiments, the gas inlet opening ranges in diameter from about 0.3 inches to about 0.7 inches. In an embodiment, the top capping portion 6 comprises a single centrally located gas inlet opening 10. The gas inlet opening 10 opens to an axial gas conduit 15 for gas flow. The gas conduit 15 has a lower gas conduit opening 20 that opens to a mixing cavity 25. In embodiments, the gas conduit 15 is coaxial with mixing cavity 25. In embodiments, the gas conduit is in a vertical orientation. As gas flows through the gas conduit, a pressure difference is created between the pressure in the mixing cavity 25 and the pressure at the gas inlet opening 10. This pressure difference between the lower relative pressure in the interior of the flow distribution device and the higher relative pressure on the exterior of the flow distribution device helps drive liquids into the interior of the flow distribution device through one or more lateral openings 35. Due to the liquid flow being at least in part due to the above described pressure differential, any tray out of levelness will have less of an effect on liquid flow. For example, as long as the lateral liquid opening or openings are below the surface of the liquid level 60, any liquid flow differentials caused by tray out of levelness will be minimized because the majority of the liquid flow is determined by the pressure differential caused by the gas flow as opposed to any pressure differential attributed to the varying liquid levels due to tray out of levelness.

In embodiments, the liquid conduit 35 is positioned such that the gas conduit opening(s) 20 into the mixing cavity 25 is on a horizontal plane which is at least as high (in a vertical dimension) as the lower extent 75 of the liquid conduit 35. In some embodiments, the gas conduit opening 20 is on a horizontal plane between the lower extent 75 and the upper extent 80 of the liquid conduit 35. In some embodiments, the gas conduit opening 20 is on a horizontal plane which is coincident with the upper extent 80 of the liquid conduit 35. In some embodiments the gas conduit opening 20 is on a horizontal plane no lower than the upper extent 80 of the liquid conduit 35.

The combination of a horizontal liquid conduit 35 and a vertical gas conduit 20 which is at least as high as the lower extent of the liquid conduit provides a flow distribution device which may be employed as a retrofit application in an existing chimney, having an existing side hole(s) 30 for liquid flow.

The number of lateral openings can vary depending on the desired flow rate. The embodiment of FIG. 1 illustrates one lateral opening for liquid flow. In other embodiments, more than one lateral opening for liquid flow may be employed. In embodiments, multiple lateral openings are on the same horizontal plane with respect to each other. In embodiments, the lateral opening can range in diameter from about 0.2 inches to about 0.75 inches, although smaller or larger diameters are not excluded and depend on the application. In some such embodiments, the lateral liquid inlet has a diameter of between 0.25 and 0.60 inches. In embodiments, the lateral opening 30 for the liquid phase is circular and forms the opening of a cylindrical liquid passageway 35. In some such embodiments, the axis of the cylindrical liquid conduit is in a horizontal orientation. In some such embodiments, the axis of the lateral opening is radial to the gas conduit, i.e. is perpendicular to the gas conduit. The cylindrical liquid conduit 35 has a circular outlet opening 40 that opens to the mixing cavity 25. In embodiments, the liquid flows in the liquid conduit in a direction perpendicular to the flow of gas in the gas conduit. In some such embodiments, at least a portion (or all) of the liquid flowing from the liquid conduit contacts the gas flowing from the gas conduit in a perpendicular direction. In general, the mixing cavity 25 has a radial diameter B that is greater than the radial diameter A of the cylindrical gas conduit 15, and greater than the radial diameter C of the liquid conduit 35. The shape of the mixing cavity can vary, provided that the mixing cavity has sufficient volume to allow mixing of the incoming gas and liquid phases prior to fluid egress. At the base of the mixing cavity 25 and below the lateral liquid opening 30 is a beveled and tapered poly-phase outlet nozzle 46. The poly-phase nozzle 46 has a radial diameter D that is less than the radial diameter B of the mixing cavity 25. In an embodiment, nozzle inlet 45 of the poly-phase nozzle 46 is fixidly coupled to and co-axially aligned with the mixing cavity 25. In some such embodiments, the nozzle inlet is co-axially aligned with the gas conduit. The nozzle inlet 45 is centrally located at the base of the mixing cavity and coaxial with the cylindrical outer wall 5. The shape of the nozzle imparts a venturi effect to the egressing fluids by accelerating and dispersing the liquid and gas phases passing out of the mixing chamber. In embodiments, the bevel of the nozzle is between 5 degrees to 85 degrees, wherein the angle of the bevel is measured from a plane bisecting the poly-phase nozzle 46 and parallel to the top capping portion. In some such embodiments, the bevel is between 30 degrees to 60 degrees, e.g. 45 degrees.

Fluids flow through the poly-phase nozzle 46 and exit the distribution device through a bottom opening 50 that is centrally located in the bottom wall 55. The radial diameter E of the bottom opening 50 is greater than the radial diameter of the most restricted portion of the poly-phase nozzle (D in the Figure). The fluids have a highly distributed spray pattern upon exiting the distribution device through the bottom opening to help ensure uniform wetting of an underlying catalyst bed (not shown). In an embodiment, the poly-phase nozzle comprises an inner wall 49. In an embodiment, the inner wall 49 is beveled. In some such embodiments, the bevel of the inner wall is between 5 degrees to 85 degrees, as measured from a plane bisecting the nozzle opening. In some such embodiments, the bevel of the inner wall is between 30 degrees and 60 degrees, e.g. 45 degrees.

In another embodiment the inner wall can be flat. By flat it is meant that the inner wall is parallel to the bottom wall 55 and/or perpendicular to the side wall 5. In an embodiment, the bottom opening has a radial diameter E that is less than the radial diameter F of the bottom wall. In another embodiment, the bottom opening has a radial diameter E that is equal to the radial diameter F of the bottom wall, i.e. the bottom opening spans the full basal area of the distribution device.

The flow distribution device of the invention allows greater tolerance for tray out of levelness than chimneys of the prior art. In addition, the flow distribution device of the invention can be used in retrofit applications, providing added economic benefit and design flexibility. Due to the design of the nozzle and diverging nozzle a spray discharge pattern that is uniform and completely wets the catalyst surface underneath the distributor can be achieved.

EXAMPLES

Example 1 (Comparative). Two identical chimneys, A and B, were installed in an 11 in. diameter test cell with chimney A approximately 0.25 in. lower than chimney B to simulate tray out of levelness. The chimneys were approximately 6 in. apart. The diameter of each chimney was 2.5 in. Two lateral openings measuring 0.5 in. diameter were present at 1.0 in. above the bottom of each of the chimneys A and B. The height of each chimney was 6.5 in. Water with a flow rate of 2.6 gallons per minute (GPM) and air with a flow rate of 8 standard cubic feet per minute (scfm) were used to simulate conditions in a downflow catalytic reactor. The water entered the chimneys through the lateral openings and gas entered through a top opening. The liquid flow rate was measured through each of the chimneys. Chimney A had a flow rate of 58.5% and chimney B had a flow rate of 41.5%.

Example 2 (invention). The experiment outlined in Example 1 was repeated with the flow distribution device of the invention inserted into each of the chimneys A and B. Flow rates were again measured through each of the chimneys. Chimney A had a flow rate of 49.3% and chimney B had a flow rate of 50.7%.

The above examples demonstrate that the flow distribution device of the invention when used as a chimney insert in a retrofit type application (Example 2) showed higher tolerance for tray out of levelness than chimneys (Example 1) without the insert. In addition, the gas/liquid mixing was improved for Example 2 as compared with Example 1 and the spray pattern for Example 2 was wider and more uniform than the spray pattern for Example 1. Thus, the fluid distribution device of the invention demonstrated improved characteristics for use as a fluid distribution device when compared with a conventional chimney.

We claim:

1. A flow distribution device for distributing a poly-phase fluid to a granular solid, comprising:
   a. at least one gas conduit for introducing a gas phase into a mixing cavity having a radial diameter which is greater than a radial diameter of the gas conduit, the gas conduit extending from a gas inlet opening that is centrally located in a top capping portion, through a lower gas conduit opening into the mixing cavity, the gas conduit opening being positioned no lower than the lower extent of a liquid conduit that is provided for introducing a liquid phase into the mixing cavity; and b. a poly-phase nozzle for accelerating and dispersing the liquid and gas phases passing out of the flow distribution device, the nozzle having an nozzle inlet that is fixidly coupled to and co-axially aligned with the mixing cavity.

2. The flow distribution device of claim 1, wherein the gas conduit is cylindrical.

3. The flow distribution device of claim 1, wherein the gas conduit is in a vertical orientation.

4. The flow distribution device of claim 1, wherein the gas conduit opening is on a horizontal plane between the lower extent and the upper extent of the liquid conduit.

5. The flow distribution of claim 1, wherein the gas conduit opening is on a horizontal plane no lower than the upper extent of the liquid conduit.

6. The flow distribution device of claim 1, wherein the poly-phase nozzle further comprises a bottom outlet.

7. The flow distribution device of claim 1, wherein the top capping portion is in fluid tight connection with a cylindrical outer wall and comprises a gas inlet that is centrally located in the top capping portion.

8. The flow distribution device of claim 1, wherein the poly-phase nozzle comprises a nozzle inlet in fluid communication with the mixing cavity.

9. The flow distribution device of claim 1, wherein the diameter of the one or more gas inlets is between about 0.1 inch and 1 inch.

10. The flow distribution device of claim 1, wherein the diameter of the one or more gas inlets is between 0.3 inches and 0.7 inches.

11. The flow distribution device of claim 1, wherein the diameter of the one or more Lateral liquid inlets is between 0.20 inches to about 0.75 inches.

12. The flow distribution device of claim 7, wherein the diameter of the outer wall is between about 1 inches and about 4 inches.

13. The flow distribution device of claim 6, wherein the diameter of the bottom opening is greater than the diameter of the poly-phase nozzle.

14. The flow distribution device of claim 8, wherein the bevel of the poly-phase nozzle is between 30 degrees and 60 degrees, as measured from a plane bisecting the poly-phase nozzle opening.

15. The flow distribution device of claim 1, wherein the poly-phase nozzle further comprises a beveled inner wall.

16. The flow distribution device of claim 15, wherein the bevel of the inner wall is between 30 degrees and 60 degrees, as measured from a plane bisecting the poly-phase nozzle opening.

17. The flow distribution device of claim 1, further comprising a chimney.

18. A distributor tray having at least one chimney for distributing a downwardly flowing poly-phase mixture including at least one gas phase and at least one liquid phase, above at least one catalyst bed of granular solid catalytic material, the chimney including one flow distribution device that has been retrofit into the chimney, the flow distribution device comprising:

a. at least one gas conduit for introducing a gas phase into a mixing cavity having a radial diameter which is greater than a radial diameter of the gas conduit, the gas conduit extending from a gas inlet opening that is centrally located in a top capping portion, through a lower gas conduit opening into the mixing cavity, the gas conduit opening being positioned no lower than the lower extent of a liquid that is provided for introducing a liquid phase into the mixing cavity; and b. a poly-phase nozzle for accelerating and dispersing the liquid and gas phases passing out of the flow distribution device, the nozzle having an nozzle inlet that is fixidly coupled to and co-axially aligned with the mixing cavity.

19. The distributor tray of claim 18, wherein the chimney has a lateral opening for liquid flow that is co-axial with the liquid conduit.

* * * * *